United States Patent
Gradincic et al.

(10) Patent No.: US 7,358,896 B2
(45) Date of Patent: Apr. 15, 2008

(54) MULTIBAND GNSS RECEIVER

(75) Inventors: Zlatan Gradincic, Redwood City, CA (US); Roberto Materni, Lamone (CH); Paolo Orsatti, Melide (CH); Francesco Piazza, Bioggio (CH)

(73) Assignee: NemeriX SA, Manno (CH)

( * ) Notice: Subject to any disclaimer, the term of this patent is extended or adjusted under 35 U.S.C. 154(b) by 0 days.

(21) Appl. No.: 11/589,607

(22) Filed: Oct. 30, 2006

(65) Prior Publication Data

US 2007/0096980 A1 May 3, 2007

(30) Foreign Application Priority Data

Nov. 3, 2005 (EP) .................................. 05110317

(51) Int. Cl.
*G01S 1/00* (2006.01)
(52) U.S. Cl. .............................. 342/357.12; 342/357.06

(58) Field of Classification Search ........... 342/357.02, 342/357.06, 357.12, 357.13; 701/213, 215
See application file for complete search history.

(56) References Cited

U.S. PATENT DOCUMENTS

| 5,805,108 A | 9/1998 | Lennen |
| 2005/0101248 A1 | 5/2005 | Vollath |

FOREIGN PATENT DOCUMENTS

EP        0 430 364 A2     6/1991

*Primary Examiner*—Dao Phan
(74) *Attorney, Agent, or Firm*—Pearne & Gordon LLP

(57) ABSTRACT

RF receiver for GNSS signals, (e.g., GPS, Galileo, Glonass), composed of a single chip and a low number of external components, has a number of independent signal paths each including a separate IF stage and baseband down-converter. Each signal path is tuned to a specific IF band by selection of external IF filters. Conversion to IF involves a common local carrier generator.

13 Claims, 2 Drawing Sheets

MULTIBAND GNSS RECEIVER

REFERENCE DATA

The present application claims priority from European paent application EP05110317 filed on Nov. 3, 2005, the content whereof is hereby incorporated by reference.

FIELD OF THE INVENTION

The present invention concerns a multiband receiver for global navigation satellite systems (GNSS). More specifically the present invention includes an integrated radiofrequency processor which is able to simultaneously receive from Different GNSS sources having different characteristics and different frequency bands, like for example satellites from the GPS, Galileo and GLONASS constellations.

BACKGROUND OF THE INVENTION AND DESCRIPTION OF RELATED ART

The Global Navigation Satellite Systems (GNSS) generically include the General Positioning System (GPS), operated by the United States, the Global Orbiting Navigation Satellite System (GLONASS) operated by the Russian Federation and the projected Galileo positioning system, to be built by the European Union.

GNSS radio signals are located in the portion of the radio spectrum above 1 GHz, have power level, at ground, of the order of −120 dBm or less and are generally direct-sequence spread-spectrum signals modulated by pseudo-random code binary sequences, which are used in the receiver for positioning and navigation. The signal structure of GPS signals is described, for example, in international patent application WO05003807, in the name of the applicant, which is hereby incorporated by reference.

Satellite radiolocalization systems, such as GPS (Global Positioning System), GLONASS or Galileo rely on the reception of radio signals broadcast from a number of orbiting satellites and use the information contained in these signals to determine the distances, or ranges, from the receiver to each of the received satellites. The orbits of the satellites being known, absolute time and the location of the GPS receiver can then be determined geometrically.

In the context of the present invention the terms "receiver" and "GPS receiver" can designate a complete self-contained receiver device, but also a module, included in a complex entity, for example a GPS module in a cellular phone, a car alarm, a PDA (Portable Digital Assistant) and so forth. The terms above may also indicate a pluggable module, which may be connected with a hosting device by means of an appropriate bus, for example a GPS PC-card.

The terms "receiver" and "GPS receiver" should also be understood, in the context of the present invention, as including one of more integrated circuits, arranged to realize a complete GPS receiver or a complete GPS module, as defined above.

Each of the satellite system in the GNSS has different signal carrier frequency; GPS satellites currently use the L1 and L2 bands, with a foreseen extension in the L5 band, but reception of the L1 signal is sufficient for providing basic functionality. Galileo foresees different carriers in the L1, E1, E2, E5 and E6 bands (see table 1). GLONASS signals are also located in bands L1 and L2. Each of these frequencies requires a specifically designed RF receiving circuit.

Once the Galileo system is fully operational, future receiver may be able to increase the number of visible satellites at any time and the coverage at high latitudes will be improved. To take advantage of this, however, future receiver will have to be able to deal with signals coming from all or at least several frequency bands.

It is an aim of the present invention to provide a multiband GNSS receiver of simple and economical construction.

It is a further aim of the present invention to provide a multiband GNSS receiver which can be easily adapted for receiving signal in a selected set of GNSS bands.

BRIEF SUMMARY OF THE INVENTION

According to the invention, these aims are achieved by means of a GNSS receiver comprising the combination of features of claim 1, preferred optional features being introduced by the dependent claims.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
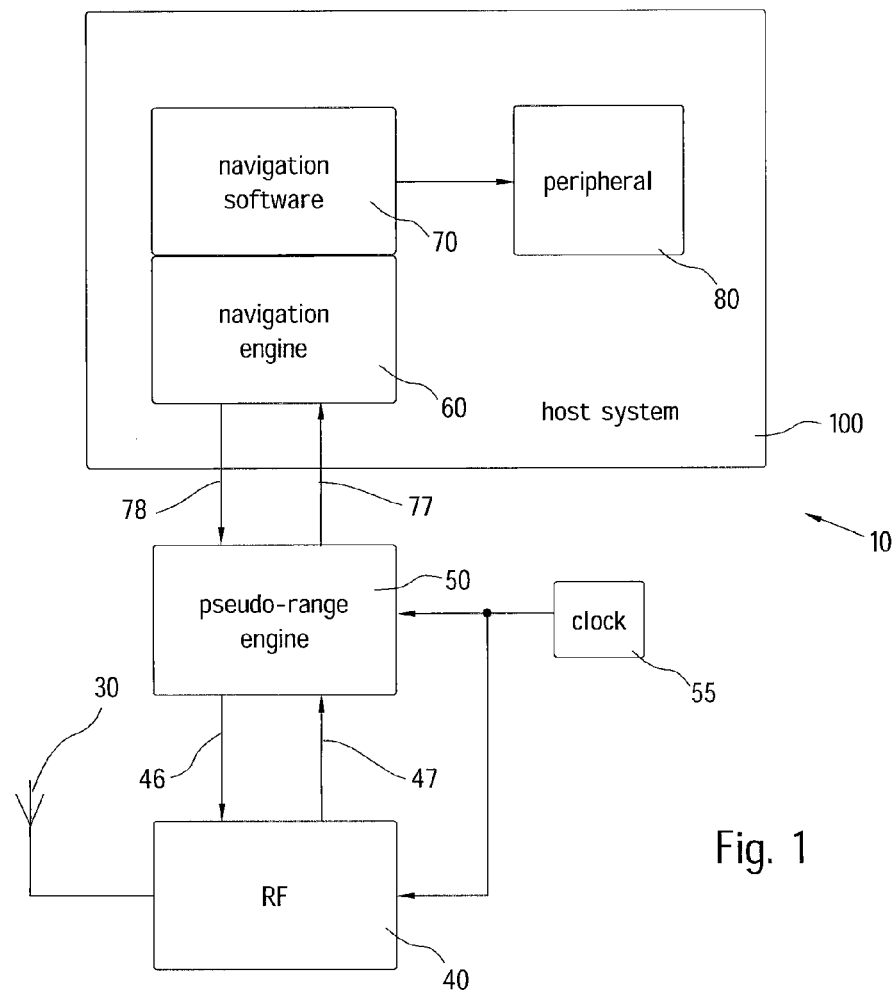
FIG. 1 shows, in a simplified schematic way, the structure of a GNSS radiolocalization device.

FIG. 1 represents schematically the layout of a generic GNSS device 10 comprising one or more antennas 30 which allow coupling with radio signals radiated from different GNSS satellites.

According to FIG. 1, the radiolocalization device 10 of the present invention comprises a RF-receiver or radiofrequency module 40, whose function, which will be discussed in detail further on, is to process the signals received from the radiolocalization satellites by the antenna 30. The radiofrequency circuit comprises a single- or multiple-conversion heterodyne radio receiver and provides at his output 47 a navigation signal of low frequency, like a baseband signal, analogue or digital, or a low-IF signal, for example a low-If signal at 4.092 MHz.

According to the modulation scheme of the received satellite constellation, the output 45 will comprise several angular component of the signal. In the case of GPS, for example, two components shifted by 90° are needed, and are conventionally referred to as the I (In-phase) and Q (Quadrature) component. Other modulation schemes, for example the modulation proposed for the GALILEO system, call for more than two angular components.

The RF module 40 is connected to a main timebase generator 55, which provides a stable timebase reference for the radiolocalization device 10, for example a 32.734 MHz timebase. Since timebase generator 55 must be relatively precise and stable to allow acquisition and tracking of the GPS signal, it comprises generally a high-quality temperature compensated crystal oscillator or TCXO.

The output 47 of the RF module 40 is fed to a signal processor 50, also called pseudo-range engine 50 which, in turn, provides control instructions 46 to the RF circuit 40. The function of the pseudo-range engine 50 is to de-spread the signals received from the satellites, by generating, for each received satellite, a local replica of the modulation code (the C/A code in the case of a commercial GPS receiver) which is precisely time-aligned with the received signal. The code shifts, or pseudo-ranges 77, generated by the pseudo-range engine 50 are transmitted to the navigation engine 60, which calculates a fix for position and time coordinates x, y, z, t. The navigation engine also steers the pseudo-range engine 20 by appropriate search instructions 78. The positional fix is usually obtained by iterative Kalman filters, and the navigation engine may need to follow the pseudo-range data 77 along several code periods until a satisfactory solution is found.

Preferably the pseudo-range engine 50 and the RF module 40 are realized as two separate integrated circuits or as a single common integrated circuit.

In a preferred variant of the invention the navigation engine 60 is part of a host system 100, which also comprises application navigation software 70 and appropriate peripherals 80 for interaction with a user. The radiolocalization device 10 of the invention is, in this case, an extension of the host system, for example in the form of an extension card or module for a cellular phone, a PDA, a game console, a personal computer or any other suitable host device. The invention comprises however also standalone apparatuses which incorporate navigation engine, application software and peripherals together with the RF module and pseudo-range engine.

In the case of a multi-standard GNSS radiolocalization device, the received satellites may belong to several satellite constellations, for example to the GPS, Galileo, or GLONASS constellations, and emit in several radio bands. The table 1 below gives a list of the main existing and projected radio GNSS signals, together with the respective center frequencies and bandwidth.

TABLE 1

GNSS signals

| Signal | Center Freq./MHz | BW/MHZ | Service |
|---|---|---|---|
| GPS L1 | 1575.420 | 20.46 | Open |
| GPS L2 | 1227.600 | 20.46 | Open |
| GPS L5 | 1176.450 | 24.00 | Open |
| GAL L1 | 1575.420 | 4.00 | Open |
| GAL E1L1E2 | 1575.420 | 32.00 | Open |
| GAL E5a | 1176.450 | 20.46 | Open |
| GAL E5b | 1207.140 | 20.46 | Open/Encr. |
| GAL E6 | 1278.750 | 10.23 | Encrypted |
| GAL E6 | 1278.750 | 40.00 | Encrypted |
| GAL E5ab | 1191.795 | 51.15 | Open/Encr. |
| GLO L1 | 1603.41 | 12.27/20.92 | Open |
| GLO L2 | 1247.09 | 9.77/18.52 | Open |

In contrast to many commercial GPS devices, which use only the GPS L1 signal for the radiolocalization, the GNSS device of the invention is able to receive and process GNSS positioning signal in several different bands, for example in the L1, L2 and L5/E5 bands, in order to be able to cope with GPS and Galileo signals. Preferably the receiver 40 can be tuned in the desired GNSS signals after its manufacturing.

Figure 3:
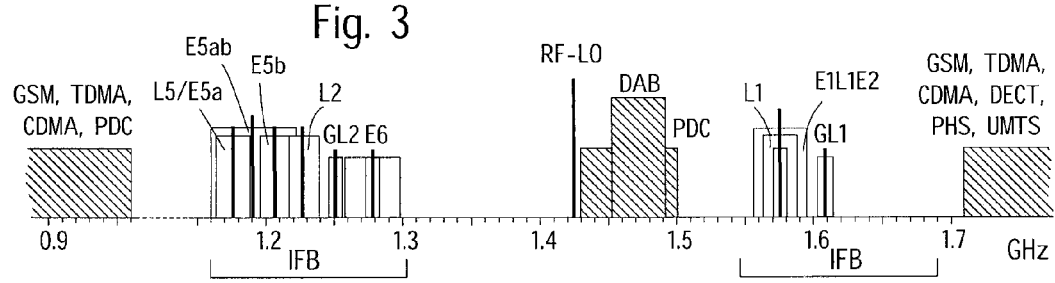
FIG. 3 illustrates the frequency allocation of the relevant GNSS radio channels and of some of the most important interferer signals.

The frequency bands of the GNSS signals partially overlap and are shown on the frequency diagram of FIG. 3. The same or nearby frequency bands are also occupied by interferer signals of various nature as shown in table 2 below.

TABLE 2 interferer signals

| Signal | Freq. Range | Power |
|---|---|---|
| Satellite communication 1 | 1544.5 | Mid |
| Satellite communication 2 | 2200-2300 | Mid |
| UHF TV | 500-860 | Strong |
| CT2/+ cordless phones | 864-948 | Weak |
| DAB | 1452-1492 | Strong |
| GSM cell-phones | 824-960 | Mid |
|  | 1710-1990 |  |
| TDMA, IS-54 cell-phones | 854-894 | Mid |
|  | 1850-1990 |  |
| CDMA, IS-95 cell-phones | 824-894 | Mid |
|  | 1850-1990 |  |
| DECT cordless phones | 1880-1900 | Weak |
| PHS phones | 1895-1918 | Weak |
| PDC cell-phones | 810-956 | Mid |
|  | 1429-1501 |  |
| UMTS/WCDMA cell-phones | 1900-2170 | Mid |
| Bluetooth | 2402-2495 | Weak |
| WLAN (IEEE802.11b) | 2410-2483 | Mid |
| UWB | 1000-3000 | Weak |

The most relevant interferer signals, deriving from DAB, PDC and various wireless communication standards, are also represented by the hatched rectangles in FIG. 3.

Cell-phone signal are particularly strong interferers for the on-board GNSS receiver in cell-phones, for example, in these system the cell-phone source and the GNSS receiver must be active simultaneously on the same board. The same problem occurs in space-borne applications, in which the GNSS receiver is exposed to a strong interfering signal from the satellite's communication system. Other known interferers are radar, microwave ovens, and harmonics of UHF TV signals.

Figure 2:
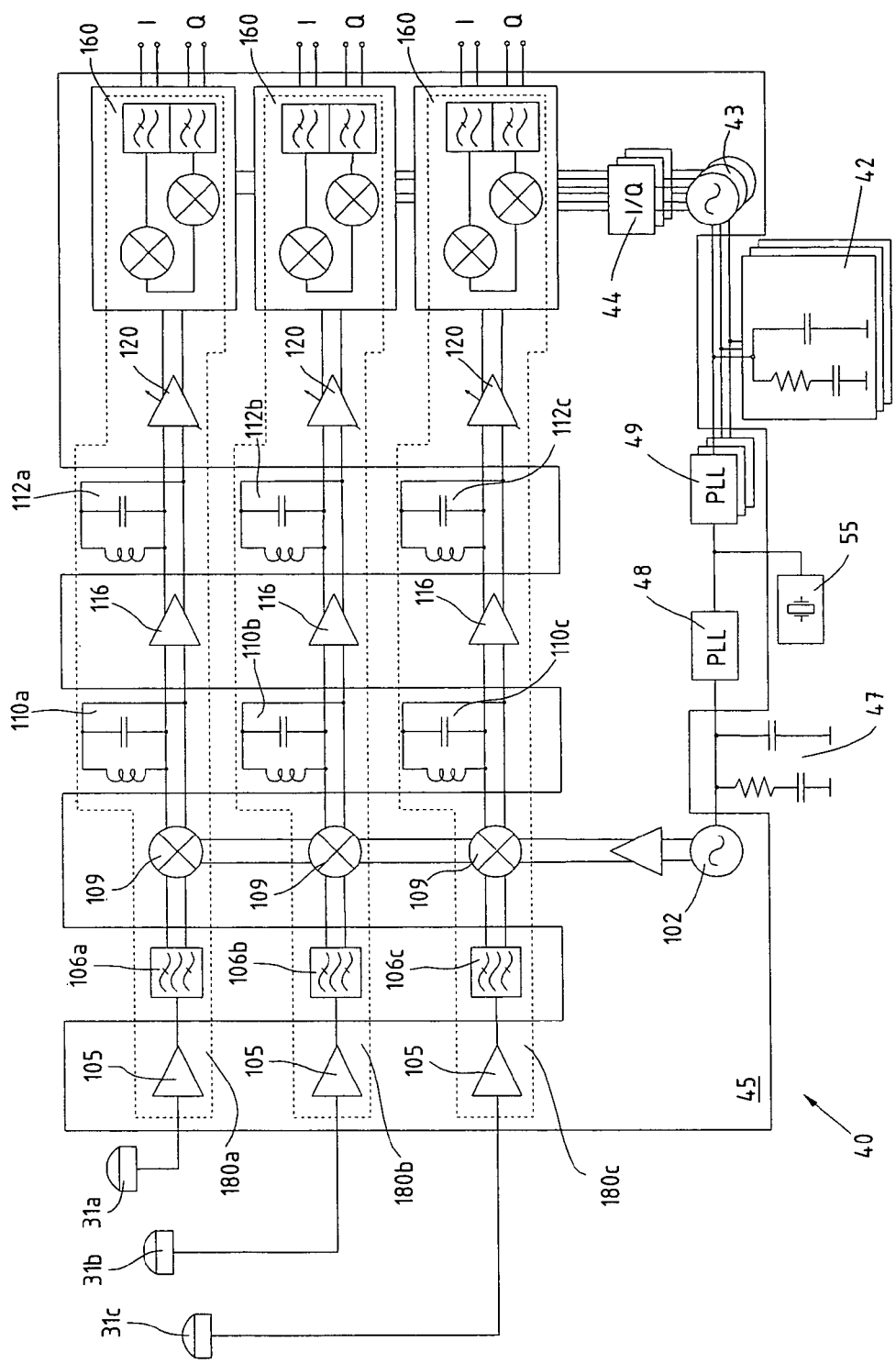
FIG. 2 depicts schematically a RF-receiver according to the present invention.

The architecture of the GNSS receiver 40 is illustrated in the block diagram of FIG. 2. The receiver 40, which preferably consists in a single monolithic RF chip 45 plus a small number of external components, comprises a number of independent signal paths 180a, 180b, 180c, each of which is dedicated to the processing of a determined band of GNSS signals. One path could be dedicated, for example to the L1 band, one to the L2 band and one to the L5 and E5 bands. This allocation would allow covering all the GPS signals and the most important Galileo signals. Other combinations are however possible, and comprised in the scope of the present invention. The number of independent signal paths is not restricted to three either, the invention comprising also GNSS receiver and devices having two, four or any number of independent signal paths.

Preferably each signal path is connected to an independent external antenna 31a, 31b, 31c, which can be, for example passive antennas tuned to a specific signal frequency and bandwidth. For the sake of cost and simplicity, however, a lesser number of antennas or a common broadband antenna may also be used. In some application, where highest sensitivity is needed, the passive antennas can be replaced by active antennas including a low-noise amplifier.

The receiver comprises preferably, in each signal path of the chip 45, a low-noise L-band amplifier 105 and a tuned RF filter 106a, 106b, 106c. RF filters 106a, 106b and 106c are preferably band-pass SAW filters external to the chip 45, and can be selected according to the desired frequency bands.

Low-noise amplifiers 105 are preferably realized in the RF chip 45 and based on SiGe transistors. As an alternative, the internal LNA's 105 can be replaced by an external GaAs LNA.

In some application it may be desirable to use a common antenna and LNA for several channels, for example adjacent L2 and L5 channels. In such cases the output of the single LNA can be connected via appropriate LC and SAW filters to two signal paths of the chip 45.

All the incoming radio signals are converted by mixers 109 into intermediate frequency signals in the same frequency region, for example in the region of 150-250 MHz. A single local oscillator 102 provides a RF local oscillator signal RF-LO which is used to convert all the received UHF signals. In this example the local oscillator 102 consists in a VCO which is synchronized, via the PLL circuit 48 and the loop filter 47, with the main clock 55. In this case, but not necessarily, the loop filter 47 is external to the RF receiver chip 45. The mixers represented in FIG. 2 are balanced-differential mixers, which have the advantage of a higher linearity and a more favorable noise figure.

Advantageously, the frequency of the local oscillator 102 is placed at the middle point of the frequency span comprising all the possible GNSS signals; in practice midway between L1 and L5 bands. For example the RF-LO frequency could be fixed at 1424 MHz, as shown on FIG. 3.

This choice ensures that all the GNSS frequencies are converted to an intermediate frequency signal comprised in the intermediate frequency bandwidth IFB, while the interferers are converted into signals of lower or higher frequency, and thus rejected.

Preferably, the intermediate frequency signal is amplified by IF amplifiers 116 and 120. In this example two IF gain stages are foreseen, even if this feature is not to be considered a limitation of the present invention. The second stage includes variable-gain amplifiers 120, which are externally controlled in a continuous way by the pseudo-range engine 50 to realize an AGC function. In a variant of the invention, the gain of all the IF stages could be regulated at the same time. In a further, simpler, variant the desired gain variation can be obtained by switching gain stages in and out.

The bandwidth of the IF amplifier, which are included in the RF chip 45, is sufficient to cover all desired IF frequencies, for example from 150 to 250 MHz. Each signal path, however, can be tuned to a specific frequency and signal bandwidth by dimensioning the external IF filters 110a, 110b, 110c and 112a, 112b, 112c.

The IF filters 110a, 110b, 110c and 112a, 112b, 112c are represented in FIG. 3 as simple RC cells. This realization, even if practically appropriate, is not however a limiting feature of the present invention and the IF filter may be replaced, in variants non represented, by more complex LC circuits, or by filter comprising SAW devices.

Since all IF amplifiers are of the same type and the IF filters are very similar, good phase coherence between channels is achieved.

By placing the local oscillator frequency RF-LO midway between L1 and L2/L5, the extremes of the useful frequency bands, the image frequencies in the IF stage will fall also in the same L1 and L2/L5 band, where no Strong Interferer exist, thus simplifying the suppression of the image signals. The RF filters 106a-106c are useful for the rejection of these image signals.

A second frequency conversion is done, for each signal path 1801-180c, in the quadrature down-converters 160, which provide, for each signal, a pair of quadrature baseband analogue signals I and Q. Each down-converter 106 uses a second local oscillator 43 for the conversion into baseband.

Even if the presented example concerns a receiver 40 with an analogue baseband output, this is not a limiting feature of the present invention which includes as well receivers with digital output, preferably including a bank of A/D converters on the RF chip 45, and receivers with a low-IF output, of lower frequency than the IF signal, of digital or analogue nature.

The local oscillators 43 are preferably realized on the integrated circuit 45. The invention includes however also the case in which the local oscillators are totally external to the RF chip 45, and the intermediate case in which the local oscillator comprise components external to the RF chip 45, for example an external tank inductor or an external tank circuit.

The local oscillators 43 are synchronized to the main clock signal 55 by PLL 49 and loop filters 42. The frequency of the local oscillator must equal the center frequency of the IF signal for conversion into baseband, and this is obtained by the programmable I/Q dividers 44.

The receiver 40 is extremely flexible, in that each signal path can be easily configured for different signals, by selecting the external components, like the RF filters 106a-106c and the IF filters 110a-110c and 112a-112c, for tuning each intermediate frequency stage of each signal path to an individual IF band, different from the IF band of the other signal paths.

What is claimed is:

1. A receiver for navigation satellites comprising:
    a plurality of signal paths, each path being adapted for the reception of a determined satellite radio signal associated with a carrier frequency and a bandwidth; and
    a local carrier source for providing a common local carrier signal to the receiver; each signal path comprising:
        a first down-conversion stage, in which the satellite radio signal is combined with the signal of the local carrier source for conversion into an intermediate frequency signal; and
        a second down-conversion stage, in which the intermediate signal is converted into a low-frequency signal, wherein
        each of the second down-conversion stages of each signal path comprises a further local oscillator and control means for synchronizing the further local oscillator to a main clock signal of the receiver.

2. The receiver of claim 1, wherein each signal path further comprises at least one intermediate frequency amplifier, and wherein the intermediate frequency amplifiers and the first and second down-conversion stages of the signal paths are comprised in a monolithic integrated circuit.

3. The receiver of claim 2, wherein the signal paths further comprise RF-filters for the satellite radio signals and/or intermediate-frequency filters for the intermediate frequency signal.

4. The receiver of claim 3, wherein the RF-filters and/or the intermediate-frequency filters are external to the integrated circuit.

5. The receiver of claim 4, wherein the frequency of the local carrier signal is chosen at the middle point of the frequency span comprising the satellite radio signals.

6. The receiver of claim 3, wherein each signal path can be tuned to a specific satellite radio signals by dimensioning the RF-filters and/or the intermediate-frequency filters.

7. The receiver of claim 1, characterized by the fact that each signal path has a intermediate frequency stage tuned to a different intermediate frequency than the intermediate frequency stages of the other signal paths.

8. The receiver of claim 1, wherein each intermediate frequency stage of each signal path is tuned to a determined IF band by selecting the values components external to the RF chip.

9. Radio-frequency processing semiconductor chip comprising:
a plurality of signal paths, each path being adapted for the reception of a determined satellite radio signal associated with a carrier frequency and a bandwidth; and
a local carrier source for providing a common local carrier signal to a receiver, wherein each signal path comprises:
a first down-conversion stage, in which the satellite radio signal is converted into an intermediate frequency signal, and
a second down-conversion stage, in which the intermediate signal is converted into a low-frequency signal by mixing with the common local carrier signal, wherein,
the second down-conversion stage of each signal path comprises a further local oscillator, and control means for synchronizing the further local oscillator to a main clock signal of the receiver;
wherein the semiconductor chip further comprises, for each signal path, external component connection pins, to which at least one external component can be connected, the frequency response of each signal path being dependent on the choice of the at least one external component.

10. The radio-frequency processing semiconductor chip of claim 9, comprising a local carrier source for providing a common local carrier signal to the receiver, and an intermediate frequency stage in each signal path, wherein the external component connection pins are arranged for inserting tuned filters in each intermediate frequency stage of each signal path, whereby each intermediate frequency stage is tuned to a determined IF band.

11. The receiver of claim 1, wherein the second down-conversion stage is arranged to convert the intermediate signal into a baseband signal.

12. The Radio-frequency processing semiconductor chip of claim 9, wherein the second down-conversion stage is arranged to convert the intermediate signal into a baseband signal.

13. A receiver for navigation satellites comprising:
a plurality of signal paths, each path being adapted for the reception of a determined satellite radio signal associated with a carrier frequency and a bandwidth;
a local carrier source for providing a common local carrier signal to the receiver; each signal path comprising:
a first down-conversion stage, in which the satellite radio signal is combined with the signal of the local carrier source for conversion into an intermediate frequency signal, the local carrier signal being set at the middle point of the frequency span comprising the satellite radio signals;
at least one intermediate frequency stage, comprising an intermediate-frequency amplifier;
a second down-conversion stage, in which the intermediate signal is converted into a pair of baseband quadrature signals, wherein
the intermediate frequency amplifiers and the first and second down-conversion stages of the signal paths are comprised in a monolithic integrated circuit, and each of the second down-conversion stages of each signal path comprises a further local oscillator, and control means for synchronizing the further local oscillator to a main clock signal of the receiver,
the receiver further comprising one or both of: RF-filters provided external to the monolithic integrated circuit for the satellite radio signals, and intermediate-frequency filters provided external to the monolithic integrated circuit for the intermediate frequency signal, wherein
the intermediate-frequency filters are designed to tune each intermediate frequency stage of each signal path to a different intermediate frequency than the intermediate frequency stage of other signal paths.

* * * * *